Patented Feb. 9, 1932

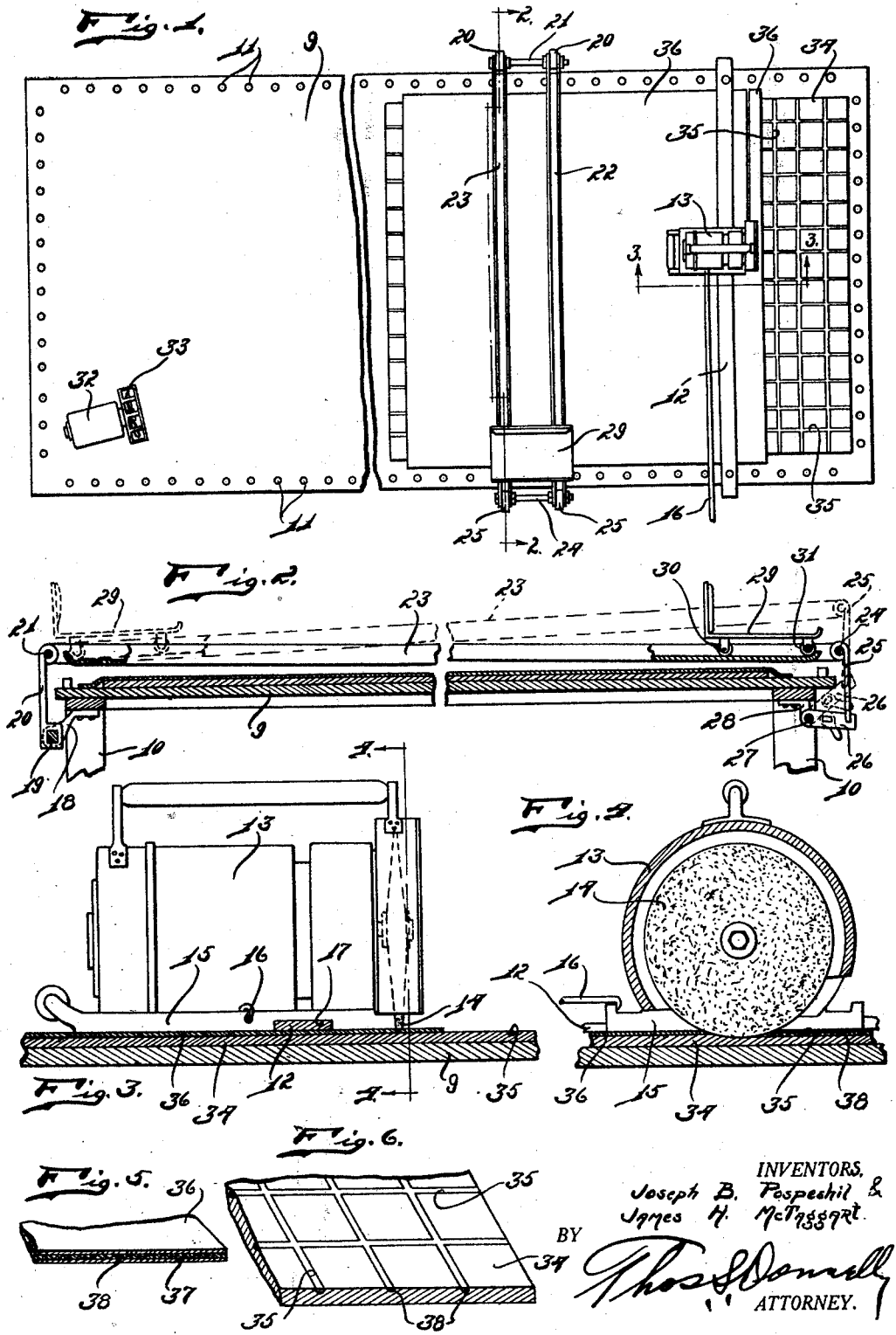

1,844,587

UNITED STATES PATENT OFFICE

JAMES H. McTAGGART AND JOSEPH B. POSPESHIL, OF DETROIT, MICHIGAN

PROCESS FOR SCORING MATERIAL

Application filed April 1, 1929. Serial No. 351,805.

Our invention relates to a new process for scoring material. It is especially adapted for use in scoring sheets, etc. of material which are used for simulating tile or which bear on their face a pattern outlined by the scoring. When such material is used as tile or wall coverings, where the material is likely to be brought into contact with water, it is desirable that the scorings be sealed so that the water cannot enter the fiber or grain of the material. To this end, it is customary to affix in the groove or scoring, sealing material after the formation of the grooves and in the present invention it is one of the objects to provide a process whereby the scoring and grooving may be accomplished simultaneously with the sealing.

Another object of the invention is the provision of an apparatus for effecting the scoring and sealing in this manner.

Another object of the invention is the provision of a novel method of sealing the grooves or scoring as formed.

Other objects will appear hereinafter.

The invention consists in the combination and arrangement of parts hereinafter described and claimed.

The invention will be best understood by a reference to the accompanying drawings which form a part of this specification, and in which, Fig. 1 is a fragmentary top plan view of the apparatus used in carrying out the invention.

Fig. 2 is a view taken on line 2—2 of Fig. 1.

Fig. 3 is a fragmentary view taken on line 3—3 of Fig. 1.

Fig. 4 is a view taken on line 4—4 of Fig. 3.

Fig. 5 is a fragmentary view of a strip of sealing material used.

Fig. 6 is a fragmentary view of the finished product.

In the drawings, I have illustrated the invention as carried out on a table 9 supported by suitable legs 10. Projecting from the upper surface of the table 9 at the edges thereof are pegs 11 which are spaced apart, the corresponding pegs at one edge registering with corresponding pegs at the opposite edge. A guide strip 12 is used for guiding the scoring or grinding machine 13. This machine 13 carries the grinding wheel 14 which is operated by an electric motor in the usual manner. Attached to the base 15 of the grinding machine is a cord 16. A groove 17 is formed in the under surface of the base 15 in which engages the guide bar 12. This guide bar is provided adjacent its opposite ends with openings adapted to receive the pegs 11. Secured to the under surface of the base 9 are brackets 18 which serve to support a rod 19 on which are slidably mounted the arms 20, these arms being connected together by the bolt 21 which serves as a pivot for the carriage tracks 22 and 23. The opposite end of the carriage tracks are pivoted on the bolt 24 which extends through the arms 25, each of these arms being pivotally connected to a link 26 which is pivoted on the rod 27 supported by the bracket 28. The rods 27 and 19 extend longitudinally the full length of the bed 9 so that the carriage tracks may be moved longitudinally of the bed. Normally, these rods incline to one side of the table as shown in full lines in Fig. 2. Upon tilting the link 26 into the position shown in dotted lines in Fig. 2, the tracks may be tilted to incline in the opposite direction. Mounted on the tracks is a carriage plate 29 having wheels 30 and 31 which engage in the tracks.

Supported on the table bed 9 is a motor 32 adapted to drive the fan 33. In operation, the sheet 34 of material in which the grooves 35 are to be formed and on which the scoring is to be made, is positioned on the table bed 9 and the bar 12 is brought in position to align the grinding wheel 14 properly on the material 34. Positioned over the material 34 is a layer of sealing material consisting of layers 36 and 37 of suitable fibrous material such as paper, sufficient to serve as a support or carrying medium for the layer 38 of tar, asphalt or other suitable sealing material.

In operation, we have found that tar and asphalt serve admirably for sealing purposes to provide a durable and water tight seal. After the sealing material has been placed upon the material 34, the motor is set into operation to effect a rotation of the wheel 14 and the grinding tool is then drawn by the cord 16 transversely of the table so as to form the groove. In this formation, the sealing material is severed in strips and the portion of asphalt, tar or sealing material positioned over the groove formed, is forced into the groove as clearly appears in Fig. 6 so as to seal the groove simultaneously with its formation. The fan 33 directs a blast of air across the material operated upon so that spattered particles of the sealing material, which becomes quite soft because of the heat generated by the wheel 14, are quickly cooled by the blast so as to prevent their adhering to the surface of the sheet 34. The operator drawing a grinder across the table then places the machine on the carriage plate 29 raising the tracks into the dotted line position shown in Fig. 2, whereupon the carriage with the grinding tool slides to the opposite side of the table where it is placed in proper operative position by an operator at the opposite side of the table.

In addition to forming a most effective seal, the method of sealing is one which is quite economical as but a single operation is required for forming the scoring and groove and for sealing, whereas, in present methods, a second operation is necessary for sealing.

While we have illustrated and described the preferred form of our invention we do not wish to limit ourselves to the precise detail of structure shown but desire to avail ourselves of such variations and modifications as come within the scope of the appended claims.

Having thus described our invention, what we claim as new and desire to secure by Letters Patent is:

1. The process of scoring and sealing the scoring in material consisting in interposing between the scoring mechanism and the material to be scored, a layer of sealing material and scoring the material through the sealing material.

2. The method of scoring and sealing the scoring in material consisting in interposing between the scoring mechanism and the material to be scored a suitable sealing material capable of being softened by the heat of the scoring mechanism and then scoring the material through the sealing material.

3. The process of scoring and sealing the scoring in material consisting in interposing between the scoring mechanism and the material to be scored, a layer of sealing material and scoring the material through the sealing material and simultaneously with the scoring operation effecting a cooling of the sealing material.

4. The process of scoring and sealing the scoring in material consisting in interposing between the scoring mechanism and the material to be scored, a layer of sealing material and scoring the material through the sealing material and simultaneous with the scoring operation directing a cooling blast against the sealing material.

5. The method of scoring and sealing the scoring in material consisting in interposing between the scoring mechanism and the material to be scored, a suitable sealing material capable of being softened by the heat of the scoring mechanism and then scoring the material through the sealing material and simultaneous with the scoring operation, effecting a cooling of the sealing material.

6. The method of scoring and sealing the scoring in material consisting in interposing between the scoring mechanism and the material to be scored, a suitable sealing material capable of being softened by the heat of the scoring mechanism and then scoring the material through the sealing material and simultaneous with the scoring operation directing a cooling blast against the sealing material.

In testimony whereof we have signed the foregoing specification.

JOSEPH B. POSPESHIL.
JAMES H. McTAGGART.